(12) United States Patent
Gruber et al.

(10) Patent No.: US 10,706,494 B2
(45) Date of Patent: *Jul. 7, 2020

(54) UNIFORM PREDICATES IN SHADERS FOR GRAPHICS PROCESSING UNITS

(71) Applicant: QUALCOMM Incorporated, San Diego, CA (US)

(72) Inventors: Andrew Evan Gruber, Arlington, MA (US); Pramod Vasant Argade, San Diego, CA (US); Jing Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,336

(22) Filed: Aug. 14, 2018

(65) Prior Publication Data

US 2019/0050958 A1     Feb. 14, 2019

Related U.S. Application Data

(63) Continuation of application No. 15/048,599, filed on Feb. 19, 2016, now Pat. No. 10,115,175.

(51) Int. Cl.
G06T 1/20     (2006.01)
G06T 5/00     (2006.01)
(Continued)

(52) U.S. Cl.
CPC ............ *G06T 1/20* (2013.01); *G06F 9/30072* (2013.01); *G06F 9/3851* (2013.01); *G06F 9/3887* (2013.01); *G06T 5/008* (2013.01)

(58) Field of Classification Search
None
See application file for complete search history.

(56) References Cited

U.S. PATENT DOCUMENTS 8,082,423 B2 * 12/2011 Abernathy .......... G06F 9/30123
                                                        712/218
8,615,646 B2    12/2013 Nickolls et al.
(Continued)

FOREIGN PATENT DOCUMENTS

CN     102640131 A     8/2012
CN     103154883 A     6/2013
(Continued)

OTHER PUBLICATIONS

"plurality, n." OED Online, 2019, Oxford University Press, retrieved from <<www.oed.com/view/Entry/146196>>. Accessed Aug. 18, 2019 (Year: 2019).*

(Continued)

*Primary Examiner* — Michael J Cobb
(74) *Attorney, Agent, or Firm* — Shumaker & Sieffert, P.A.

(57) ABSTRACT

A method for processing data in a graphics processing unit including receiving an indication that all threads of a warp in a graphics processing unit (GPU) are to execute a same branch in a first set of instructions, storing one or more predicate bits in a memory as a single set of predicate bits, wherein the single set of predicate bits applies to all of the threads in the warp, and executing a portion of the first set of instructions in accordance with the single set of predicate bits. Executing the first set of instructions may include executing the first set of instruction in accordance with the single set of predicate bits using a single instruction, multiple data (SIMD) processing core and/or executing the first set of instruction in accordance with the single set of predicate bits using a scalar processing unit.

26 Claims, 7 Drawing Sheets

(51) Int. Cl.
*G06F 9/30* (2018.01)
*G06F 9/38* (2018.01)

(56) References Cited

U.S. PATENT DOCUMENTS

| | | |
|---|---|---|
| 8,615,770 B1 | 12/2013 | Stratton et al. |
| 9,015,656 B2 | 4/2015 | Greyzck et al. |
| 9,424,038 B2 | 8/2016 | Diamos et al. |
| 9,652,284 B2 | 5/2017 | Mei et al. |
| 2005/0068325 A1 | 3/2005 | Lefebvre et al. |
| 2006/0176309 A1 | 8/2006 | Gadre et al. |
| 2008/0184211 A1* | 7/2008 | Nickolls ............... G06F 8/456 717/140 |
| 2011/0072248 A1 | 3/2011 | Nickolls et al. |
| 2011/0072249 A1* | 3/2011 | Nickolls ............ G06F 9/30072 712/234 |
| 2012/0084539 A1* | 4/2012 | Nyland ............... G06F 9/30021 712/229 |
| 2014/0244968 A1 | 8/2014 | Greyzck et al. |
| 2015/0019835 A1 | 1/2015 | Anderson et al. |
| 2015/0054837 A1 | 2/2015 | Havlir et al. |
| 2015/0205590 A1 | 7/2015 | Sabne et al. |
| 2017/0243320 A1 | 8/2017 | Gruber et al. |
| 2017/0330303 A1* | 11/2017 | Wu .................... G06F 9/30058 |
| 2020/0065098 A1* | 2/2020 | Parandeh Afshar ........................ G06F 9/30065 |

FOREIGN PATENT DOCUMENTS

| | | |
|---|---|---|
| CN | 103870246 A | 6/2014 |
| EP | 2725484 A1 | 4/2014 |
| WO | 2012049475 A1 | 4/2012 |
| WO | 2015050681 A1 | 4/2015 |

OTHER PUBLICATIONS

John Sartori, Rakesh Kumar, Branch and Data Herding: Reducing Control and Memory Divergence for Error-Tolerant GPU Applications, IEEE Transactions on Multimedia, 2013, 15(2):279-290 (Year: 2013).*
Harris M., et al., "Optimizing Parallel Prefix Operations for the Fermi Architecture, Chapter 3", GPU Computing Gems, vol. 2, Sep. 28, 2011, XP055149374, pp. 29-38, Retrieved from the Internet: URL: http://booksite.elsevier.com/samplechapters/9780123859631/Chapter_3.pdf [retrieved on Oct. 28, 2014].
International Preliminary Report on Patentability of International Application No. PCT/US2017/012748 dated Feb. 9, 2018, 6 pp.
International Search Report and Written Opinion—PCT/US2017/012748—ISA/EPO—dated Apr. 21, 2017.
Response to Written Opinion dated Apr. 21, 2017, from International Application No. PCT/US2017/012748, filed on Jul. 24, 2017, 3 pp.

* cited by examiner

UNIFORM PREDICATES IN SHADERS FOR GRAPHICS PROCESSING UNITS

This application is a continuation of U.S. application Ser. No. 15/048,599, filed Feb. 19, 2016, the entire content of which is hereby incorporated by reference herein.

TECHNICAL FIELD

The disclosure relates to multi-threaded processing and, more particularly, to techniques execution in a single instruction multiple data (SIMD) processing system.

BACKGROUND

A single instruction, multiple data (SIMD) processing system is a class of parallel computing systems that includes multiple processing elements which execute the same instruction on multiple pieces of data. A SIMD system may be a standalone computer or a sub-system of a computing system. For example, one or more SIMD execution units may be used in a graphics processing unit (GPU) to implement a programmable shading unit that supports programmable shading. A SIMD processing system allows multiple threads of execution for a program to execute synchronously on the multiple processing elements in a parallel manner, thereby increasing the throughput for programs where the same set of operations needs to be performed on multiple pieces of data A particular instruction executing on a particular SIMD processing element is referred to as a thread or a fiber. A group of threads may be referred to as a wave or warp.

Processing units, such as GPUs, include processing elements and a general purpose register (GPR) that stores data for the execution of an instruction. In some examples, a processing element executes instructions for processing one item of data, and respective processing elements store the data of the item or the resulting data of the item from the processing in the GPR. An item of data may be the base unit on which processing occurs. For instance, in graphics processing, a vertex of a primitive is one example of an item, and a pixel is another example of an item. There is graphics data associated with each vertex and pixel (e.g., coordinates, color values, etc.).

There may be multiple processing elements within a processor core of the processing element allowing for parallel execution of an instruction (e.g., multiple processing elements execute the same instruction at the same time). In some cases, each of the processing elements stores data of an item in the GPR and reads the data of the item from the GPR even if the data is the same for multiple items.

SUMMARY

In general, the disclosure describes techniques for determining predicate bits for a shader core and/or SIMD processing core of a GPU. Predicate bits indicate which portion(s) of a set of instructions one thread of a SIMD processing core will or will not execute upon reaching a branching condition in the set of instructions. In particular, this disclosure describes techniques whereby a single set of predicate bits can be stored and used by all threads of a warp in a SIMD processing core when all threads branch in the same way. Such a technique allows for simplification and power savings over using per-thread predicate bits.

In one example, the disclosure describes a method processing data in a graphics processing unit, the method comprising receiving an indication that all threads of a warp in a graphics processing unit (GPU) are to execute a same branch in a first set of instructions, storing one or more predicate bits in a memory as a single set of predicate bits, wherein the single set of predicate bits applies to all of the threads in the warp, an d executing a portion of the first set of instructions in accordance with the single set of predicate bits.

In another example, the disclosure describes an apparatus for processing data, the apparatus comprising a memory configured to store a first set of instructions, and a first processor configured to receive an indication that all threads of a warp in the first processor are to execute a same branch in a first set of instructions, store one or more predicate bits in a register as a single set of predicate bits, wherein the single set of predicate bits applies to all of the threads in the warp, and execute a portion of the first set of instructions in accordance with the single set of predicate bits.

In another example, the disclosure describes an apparatus for processing data, the apparatus comprising means for receiving an indication that all threads of a warp in a graphics processing unit (GPU) are to execute a same branch in a first set of instructions, means for storing one or more predicate bits in a memory as a single set of predicate bits, wherein the single set of predicate bits applies to all of the threads in the warp, and means for executing a portion of the first set of instructions in accordance with the single set of predicate bits.

In another example, the disclosure describes a computer-readable storage medium having instructions stored thereon that when executed cause one or more processors to receive an indication that all threads of a warp in a graphics processing unit (GPU) are to execute a same branch in a first set of instructions, store one or more predicate bits in a memory as a single set of predicate bits, wherein the single set of predicate bits applies to all of the threads in the warp, and execute a portion of the first set of instructions in accordance with the single set of predicate bits.

The details of one or more examples are set forth in the accompanying drawings and the description below. Other features, objects, and advantages will be apparent from the description, drawings, and claims.

DETAILED DESCRIPTION

Figure 1:
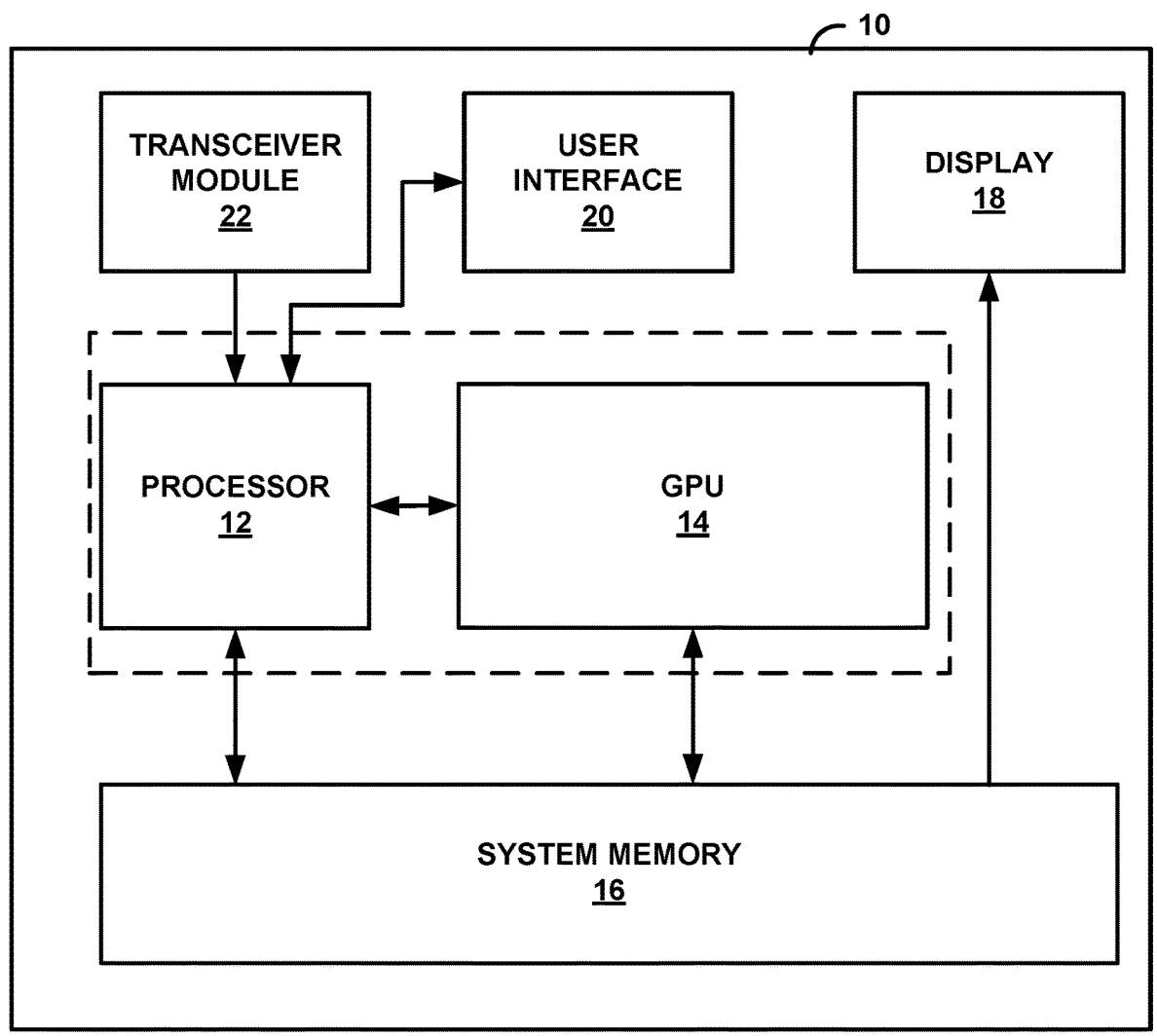
FIG. 1 is a block diagram illustrating an example device for processing data in accordance with one or more example techniques described in this disclosure.

Parallel processing units, such as graphics processing unit (GPUs) that are configured to perform many operations in parallel (e.g., at the same time), include one or more processor cores (e.g., shader cores for a GPU) that execute instructions of one or more programs. For ease of description, the techniques described in the disclosure are described with respect to a GPU or a general purpose GPU (GPGPU). However, the techniques described in this disclosure may be extended to parallel processing units that are not necessarily GPUs or GPGPUs, as well as non-parallel processing units (e.g., ones not specifically configured for parallel processing).

The GPU may be designed with a single instruction, multiple data (SIMD) structure. In the SIMD structure, a shader core (or more generally a SIMD processing core) includes a plurality of SIMD processing elements, where each SIMD processing element executes instructions of the same program, but on different data. A particular instruction executing on a particular SIMD processing element is referred to as a thread or a fiber. A group of threads may be referred to as a wave or warp. All of the processing elements together that execute a warp may be referred to as a vector processing unit, where each lane (e.g., processing element) of the vector executes one thread. Each SIMD processing element may be considered as executing a different thread because the data for a given thread may be different; however, the thread executing on a processing element is the same instruction, of the same program, as the instruction executing on the other processing elements. In this way, the SIMD structure allows the GPU to perform many tasks in parallel (e.g., at the same time).

A SIMD processing core may include multiple processing elements, with each processing element executing a thread. Each processing element executes the same set of instructions in parallel. In some situations, a set of instructions may include a conditional branching instruction (e.g., an if-then-else instruction). As each processing element operates on different data, different threads in the same warp may branch in different ways. That is given the different input data for each thread, the condition of whether to take the "then" branch of the conditional instruction or the "else" branch of the conditional may be different per each thread.

In some examples, control flow for the SIMD processing core is performed on a "per-thread" basis using predicate bits that indicate how each thread (lane) of the SIMD vector (e.g., how each processing element) should branch (i.e., in the case the single set of instructions includes a branching instruction). Because the threads have independent data, these predicates typically don't have any correlation to each other. However that is not always true, and for the cases where the same predicate applies to all the threads in a warp, the use of independent predicates is wasteful.

This disclosure describes methods, techniques, and devices that use a set of uniform predicates in which a single set of predicate bits applies to an entire warp. Such uniform predicates may be used when it is determined that all threads of a warp branch in the same way. In this way, power savings may be achieved as only a single test is done when using the uniform predicates, as opposed to assigning predicate bits on a per-thread basis.

In addition, this disclosure also describes the addition of a scalar processing unit in the GPU alongside a SIMD core of the GPU. The scalar processing unit may be used to execute a set of instructions that has been determined to branch in the same way for all threads of a warp. In this way, a scalar processing unit may use the uniform predicate set to execute the set of instructions with uniform branching, while the vector processing unit of the SIMD core may be used to process another set of instructions in parallel with the scalar processing unit.

FIG. 1 is a block diagram illustrating an example device for processing data in accordance with one or more example techniques described in this disclosure for execution of threads in a shader core with uniform predicates. FIG. 1 illustrates device 10, examples of which include, but are not limited to, video devices such as media players, set-top boxes, wireless communication devices, such as mobile telephones, personal digital assistants (PDAs), desktop computers, laptop computers, gaming consoles, video conferencing units, tablet computing devices, and the like.

In the example of FIG. 1, device 10 includes processor 12, graphics processing unit (GPU) 14, and system memory 16. In some examples, such as examples where device 10 is a mobile device, processor 12 and GPU 14 may be formed as an integrated circuit (IC). For example, the IC may be considered as a processing chip within a chip package, such as a system on chip (SoC). In some examples, processor 12 and GPU 14 may be housed in different integrated circuits (e.g., different chip packages) such as examples where device 10 is a desktop or laptop computer. However, it may be possible that processor 12 and GPU 14 are housed in different integrated circuits in examples where device 10 is a mobile device.

Examples of processor 12 and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks).

For purposes of illustration, the techniques described in this disclosure are described with GPU 14. However, the techniques described in this disclosure are not so limited. The techniques described in this disclosure may be extended to other types of parallel processing units (e.g., processing units that provide massive parallel processing capabilities, even if not for graphics processing). Also, the techniques described in this disclosure may be extended to processing units not specifically configured for parallel processing.

Processor 12 may execute various types of applications. Examples of the applications include operating systems, web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing.

As an example, the execution of an application on processor 12 causes processor 12 to produce vertices of primitives, where the interconnection of primitives at respective vertices forms a graphical object. In this example, the graphics data that processor 12 produces are the attribute data for the attributes of the vertices. For example, the application executing on processor 12 may generate color values, opacity values, coordinates, etc. for the vertices, which are all examples of attributes of the vertices. There may be additional attributes as well, and in some examples, the application need not produce all of the example attributes. In general, the techniques are extendable to data types (e.g., counters) other than attribute data, and the techniques should not be considered limited to attribute data or limited to examples of attribute data such as color values, opacity values, coordinates, etc.

In some non-graphics related examples, processor 12 may generate data that is better suited to be processed by GPU 14. Such data need not be for graphics or display purposes. For instance, processor 12 may output data on which matrix operations need to be performed by GPU 14, and GPU 14 may in turn perform the matrix operations.

In general, processor 12 may offload processing tasks to GPU 14, such as tasks that require massive parallel operations. As one example, graphics processing requires massive parallel operations, and processor 12 may offload such graphics processing tasks to GPU 14. However, other operations such as matrix operations may also benefit from the parallel processing capabilities of GPU 14. In these examples, processor 12 may leverage the parallel processing capabilities of GPU 14 to cause GPU 14 to perform non-graphics related operations.

Processor 12 may communicate with GPU 14 in accordance with a particular application processing interface (API). Examples of such APIs include the DirectX® API by Microsoft®, the OpenGL® API or OpenGL ES® API by the Khronos group, and the OpenCL™ API; however, aspects of this disclosure are not limited to the DirectX API, the OpenGL API, or the OpenCL API, and may be extended to other types of APIs. Moreover, the techniques described in this disclosure are not required to function in accordance with an API, and processor 12 and GPU 14 may utilize any technique for communication.

Device 10 may also include display 18, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 18 may be external to device 10 in examples where device 10 is a desktop computer. As another example, user interface 20 may be part of display 18 in examples where display 18 is a touch-sensitive or presence-sensitive display of a mobile device.

Display 18 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 18. Transceiver module 22 may include circuitry to allow wireless or wired communication between device 10 and another device or a network. Transceiver module 22 may include modulators, demodulators, amplifiers and other such circuitry for wired or wireless communication.

System memory 16 may be the memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 and/or GPU 14 to perform the functions ascribed in this disclosure to processor 12 and GPU 14. Accordingly, system memory 16 may be a computer-readable storage medium having instructions stored thereon that, when executed, cause one or more processors (e.g., processor 12 and GPU 14) to perform various functions.

In some examples, system memory 16 may be a non-transitory storage medium. The term "non-transitory" may indicate that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

For example, as described in more detail elsewhere in this disclosure, system memory 16 may store the code for a compiler that executes on processor 12 that performs techniques of one or more examples described in this disclosure. System memory 16 may also store code for shader programs (e.g., a vertex shader, a pixel or fragment shader, a compute shader, etc.) that execute on a shader core of GPU 14.

The term graphics item is used in this disclosure to refer to a base unit on which GPU 14 performs parallel processing. GPU 14 may process a plurality of graphics items in parallel (e.g., at the same time). For example, a vertex shader may process a vertex, and GPU 14 may execute a plurality of instances of the vertex shader in parallel to process a plurality of vertices at the same time. Similarly, a pixel or fragment shader may process a pixel of a display, and GPU 14 may execute a plurality of instances of the pixel shader in parallel to process a plurality of pixels of the display at the same time. A vertex and a pixel are examples of a graphics item.

For non-graphics related applications, the term graphics item also refers to smallest unit on which GPU 14 performs processing. However, such processing may not be graphics related. According, the term "graphics item" is meant to refer to items that a graphics processing unit (e.g., GPU 14) or a general purpose graphics processing unit (e.g., examples where GPU 14 is functioning as a GPGPU) is to process in parallel. The graphics item may be used for graphical or non-graphical purposes.

As will be explained in more detail below, according to various examples of the disclosure, GPU 14 may be configured to receive an indication that all threads of a warp in the GPU are to execute a same branch in a first set of instructions, store one or more predicate bits in a memory as a single set of predication bits, wherein the single set of predicate bits applies to all of the threads in the warp, and execute a portion of the first set of instructions in accordance with the single set of predicate bits.

Figure 2:
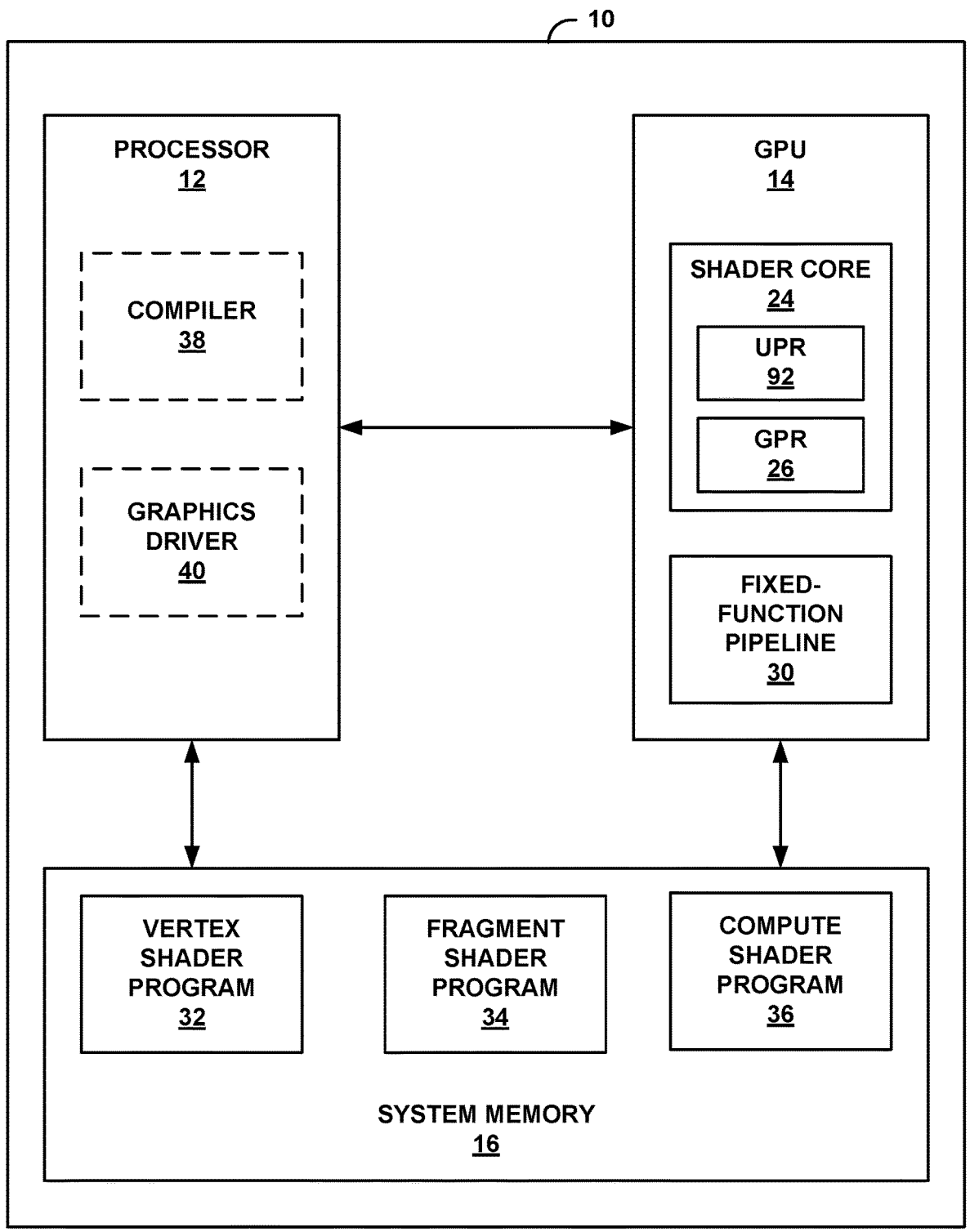
FIG. 2 is a block diagram illustrating components of the device illustrated in FIG. 1 in greater detail.

FIG. 2 is a block diagram illustrating components of the device illustrated in FIG. 1 in greater detail. As illustrated in FIG. 2, GPU 14 includes shader core 24, which includes general purpose register (GPR) 26, a uniform predicate register (UPR) 92, and fixed-function pipeline 30. Shader core 24 and fixed-function pipeline 30 may together form a processing pipeline used to perform graphics or non-graphics related functions. The processing pipeline performs functions as defined by software or firmware executing on GPU 14 and performs functions by fixed-function units that are hardwired to perform specific functions.

The software and/or firmware executing on GPU 14 may be referred to as shader programs (or simply shaders), and the shader programs may execute on shader core 24 of GPU 14. Although only one shader core 24 is illustrated, in some examples, GPU 14 may include one or more shader cores similar to shader core 24. Fixed-function pipeline 30 includes the fixed-function units. Shader core 24 and fixed-function pipeline 30 may transmit and receive data from one another. For instance, the processing pipeline may include shader programs executing on shader core 24 that receive data from a fixed-function unit of fixed-function pipeline 30 and output processed data to another fixed-function unit of fixed-function pipeline 30.

Shader programs provide users and/or developers with functional flexibility because a user can design the shader program to perform desired tasks in any conceivable manner. The fixed-function units, however, are hardwired for the manner in which the fixed-function units perform tasks. Accordingly, the fixed-function units may not provide much functional flexibility.

Examples of the shader programs include vertex shader program 32, fragment shader program 34, and compute shader program 36. Vertex shader program 32 and fragment shader program 34 may be shader programs for graphics related tasks, and compute shader program 36 may be a shader program for a non-graphics related task. In some examples, only graphics related shader programs like vertex shader program 32 and fragment shader program 34 may be used. In some examples, only non-graphics related shader programs like compute shader program 36 may be used. There are additional examples of shader programs such as geometry shaders, which are not described for purposes of brevity.

Graphics driver 40 executing on processor 12 may be configured to implement an application programming interface (API). In such examples, the shader programs (e.g., vertex shader program 32, fragment shader program 34, and compute shader program 36) may be configured in accordance with the same API as graphics driver 40. Although not illustrated, system memory 16 may store the code for graphics driver 40 that processor 12 retrieves from system memory 16 for execution. Graphics driver 40 is illustrated in a dashed box to indicate that graphics driver 40 is software, executing on hardware (e.g., processor 12), in this example. However, some or all of the functionality of graphics driver 40 may be implemented as hardware on processor 12.

Graphics driver 40 may be configured to allow processor 12 and GPU 14 to communicate with one another. For instance, when processor 12 offloads graphics or non-graphics processing tasks to GPU 14, processor 12 offloads such processing tasks to GPU 14 via graphics driver 40.

As an example, processor 12 may execute a gaming application that produces graphics data, and processor 12 may offload the processing of this graphics data to GPU 14. In this example, processor 12 may store the graphics data in system memory 16, and graphics driver 40 may instruct GPU 14 with when to retrieve the graphics data, from where to retrieve the graphics data in system memory 16, and when to process the graphics data. Also, the gaming application may require GPU 14 to execute one or more shader programs. For instance, the gaming application may require shader core 24 to execute vertex shader program 32 and fragment shader program 34 to generate images that are to be displayed (e.g., on display 18 of FIG. 1). Graphics driver 40 may instruct GPU 14 when to execute the shader programs and instruct GPU 14 with where to retrieve the graphics data needed for the shader programs. In this way, graphics driver 40 may form the link between processor 12 and GPU 14.

Graphics driver 40 may be configured in accordance to an API; although graphics driver 40 does not need to be limited to being configured in accordance with a particular API. In an example where device 10 is a mobile device, graphics driver 40 may be configured in accordance with the OpenGL® ES API. The OpenGL® ES API is specifically designed for mobile devices. In an example where device 10 is a non-mobile device, graphics driver 40 may be configured in accordance with the OpenGL® API. Other example APIs include the DirectX® family of APIs by the Microsoft® Corporation.

In some examples, system memory 16 may store the source code for one or more of vertex shader program 32, fragment shader program 34, and compute shader program 36. In these examples, compiler 38 executing on processor 12 may compile the source code of these shader programs to create object or intermediate code executable by shader core 24 of GPU 14 during runtime (e.g., at the time when these shader programs are to be executed on shader core 24). In some examples, compiler 38 may pre-compile the shader programs and store the object or intermediate code of the shader programs in system memory 16.

Shader core 24 may be configured to execute many instances of the same instruction of the same shader program in parallel. For example, graphics driver 40 may instruct GPU 14 to retrieve vertex values for a plurality of vertices, and instruct GPU 14 to execute vertex shader program 32 to process the vertex values of the vertices. In this example, shader core 24 may execute multiple instances of vertex shader program 32, and do so by executing one instance of vertex shader program 32 on one processing element of shader core 24 for each of the vertices.

Each processing element of shader core 24 may execute the same instruction of vertex shader program 32 at the same instance; however, the particular vertex values may be different because each processing element is processing a different vertex. As described above, each processing element may be considered as executing a thread of vertex shader program 32, where a thread refers to one instruction of vertex shader program 32 that is processing a particular vertex. In this manner, shader core 24 may execute many instances of vertex shader program 32 to process vertex values of a plurality of vertices in parallel (e.g., at the same time).

Shader core 24 may similarly execute many instances of fragment shader program 34 to process pixel values of a plurality of pixels in parallel or execute many instances of compute shader program 36 to process many non-graphics related data in parallel. In this manner, shader core 24 may be configured in single instruction, multiple data (SIMD) structure. For ease of description, the following is described with respect to a generic shader program, examples of which include vertex shader program 32, fragment shader program 34, compute shader program 36, and other types of shaders such as geometry shaders.

System memory 16 may store the code for compiler 38 that processor 12 retrieves from system memory 16 for execution. In the example of FIG. 2, compiler 38 is illustrated in a dashed box to indicate that compiler 38 is software, executing on hardware (e.g., processor 12), in this example. However, some functionality of compiler 38 may be implemented as hardware on processor 12, in some examples.

In accordance with the techniques of this disclosure, processor 12 may be configured to determine if a particular set of instructions from a shader program (e.g., vertex shader program 32, fragment shader program 34, compute shader program 36, or any other shader program) includes branching instructions. In this example, the set of instructions may be a particular set of instruction to be performed as a warp (e.g., using multiple threads in parallel) using shader core 24 (e.g., a SIMD processing core). Compiler 38 executing on processor 12 may be configured to make the determination that the set of instructions for the warp includes the branching instruction.

Figure 3:
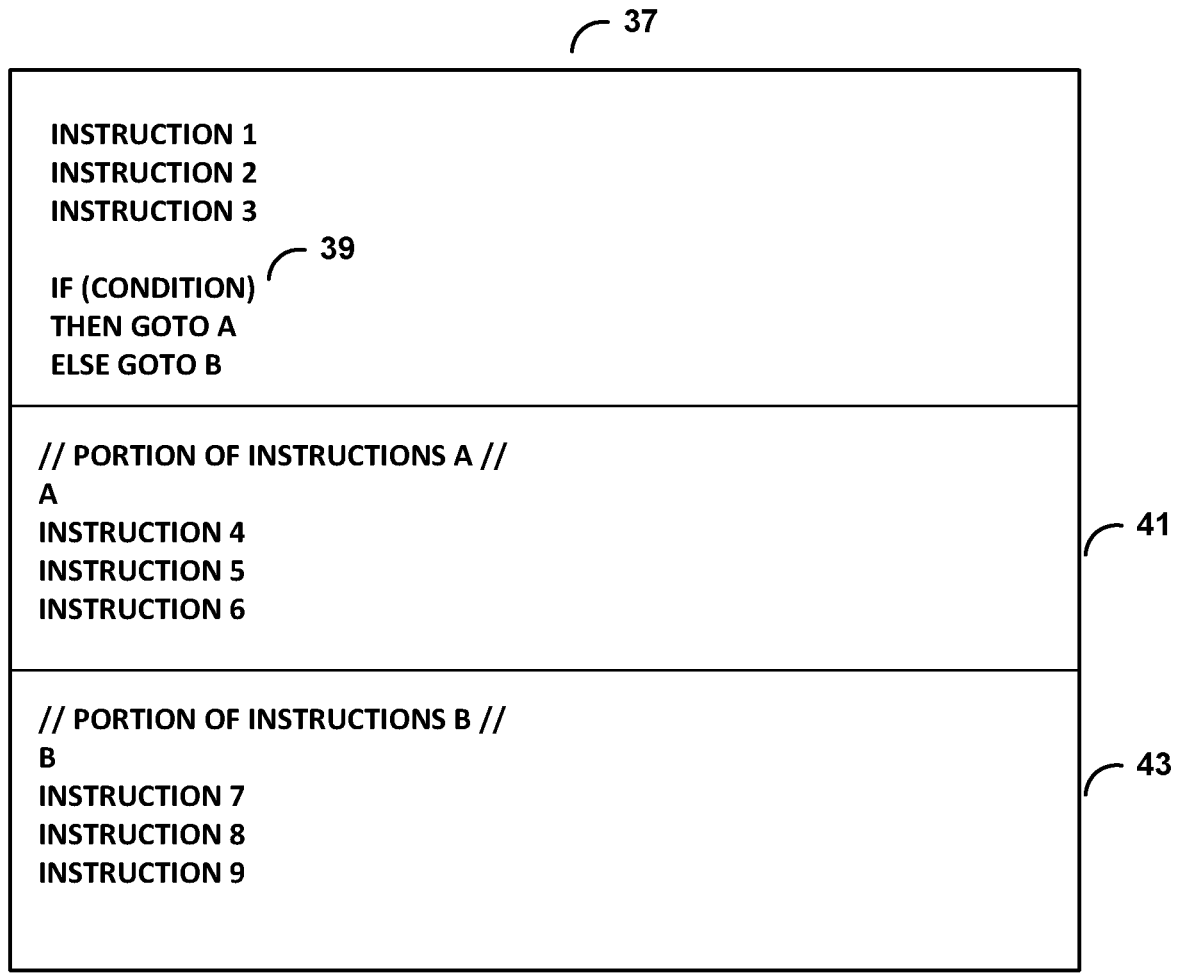
FIG. 3 is a conceptual diagram illustrating an example of a set of instructions.

FIG. 3 is a conceptual diagram showing a set of instructions 37 that include branching instruction 39. In this example, branching instruction 39 is an if-then-else branching instruction. In general terms, the 'if (condition)' term determines if a particular condition is true (e.g., by comparing one value to another value). Regardless of how the condition is determined, if the condition is true, a processing element in shader core 24 executes a first portion 41 of the set of instructions 37 (e.g., the portion of the instructions associated with the 'then' branch). If the condition is not true, a processing element executes a second portion 43 of the set of instructions 37 (e.g., the portion of the instructions associated with the 'else' branch).

Referring back to FIG. 2, GPU 14 and/or compiler 38 may be configured to determine how each thread of the warp will take the branching instruction. Based on this determination, GPU 14 and/or compiler 38 may assign predicate bits for each thread of the warp to indicate how the thread will take the branching instruction. In effect, the predicate bits indicate which portions of a set of instructions will be executed by the particular thread. For example, the predicate bits may indicate whether first portion 41 of FIG. 3 or second portion 43 of FIG. 3 are to be executed.

In some examples, the predicate bits may specify which portions of a set of instructions to execute. In other examples, the predicate bits indicate which portions of the set of instructions not to execute. Regardless, each thread of a warp executes the set of instructions in parallel. If a particular thread does not execute a particular portion of the set of instructions as indicated by the predicate bits, that particular thread performs no action (e.g., executes a no operation instructions) while other threads in the warp execute that particular portion of the set of instructions.

In accordance with the techniques of this disclosure, processor 12 (e.g., through execution of compiler 38) may be further configured to determine if all threads of a warp will take the same branch of a branching instruction. If such a determination is made, compiler 38 may indicate to GPU 14 to set a single set of uniform predicate bits that may be used for every thread in the warp. That is, rather than having separate predicates bits for each thread of a warp, when all threads take the same branch of a conditional branching instruction, only a single set of predicate bits are stored.

For example, compiler 38 may be configured to store, or cause GPU 14 to store, the single set of uniform predicate bits in UPR 92. UPR 92 may be a register or any other type of memory that is accessible by each processing element in shader core 24 that is executing a particular thread of a warp. Compiler 38 may determine that all threads of a warp take the same branch of a conditional branching instruction in any manner. For example, the compiler 38 may make such a determination in the case that the input values for the warp are constants-based or accessed from a uniform general purpose register (uGPR).

As one example, while compiling a shader program (e.g., vertex shader program 32, fragment shader program 34, or compute shader program 36), compiler 38 may determine whether a set of instructions of the shader program to be executed as a warp requires accessing uniform data. In this context, a shader program requiring access to uniform data means that each thread of the shader program executing on respective processing elements of shader core 24 each requests the same data. In this example, shader core 24 may retrieve this same data from the uGPR.

As another example, the shader program may include branching instructions (e.g., if-then-else instructions). For some particular branch, the shader program may include an instruction that sets one or more variables equal to a constant value (e.g., an instruction that sets all x, y, z, and w coordinates equal to 0). In this example, compiler 38 may determine that the constant value is data for a variable of the graphics items that is uniform across all threads in the warp.

If compiler 38 determines that the shader program requires accessing uniform data across the graphics wave, compiler 38 may include an explicit instruction that indicates to shader core 24 that the data is uniform across the graphics wave. In response, GPU 14 may set uniform predicate bits in UPR 92. In some examples uniform data may be stored in a section of GPR 26 that is allocated for storing uniform data (i.e., data that is uniformly accessible by all threads of warp). Such a section of GPR 26 allocated for uniform data may be referred to as the uGPR.

Consider a general example of code that includes branching instructions. For example, in a high level language, an example of a branching instruction might be:

```
If (A = B)
{       <perform action 1>}
Else
{       <perform action 2> }
```

In one example, such code might be compiled by compiler 38 to:

```
CMP.EQ   PR0 <- R0,R1  //R0 is a register that holds 'A', R1 is a register that
holds 'B', P0 is the single bit predicate that holds the compare result.
BRA            !PR0 , ELSE  //Branch instruction to label 'ELSE' if PR0 is '0'
  <action 1 >
BRA            CONTINUE   //unconditional branch around 'else' clause
  ELSE:              <action 2>
  CONTINUE:    <rest of program>
```

In another example, 'predication' could be used instead of 'branch' instructions:

```
CMP.EQ   PR0 <- R0,R1    //R0 holds 'A', R1 holds 'B', P0 is the
single bit predicate that holds the compare result
(PR0)         <action 1>   //only execute <action 1> if PR0 == 1
(!PR0)        <action 2>   //only execute <action 2> if PR0 == 0
<rest of program>
```

If compiler 38 could not determine that the values in R0 and R1 are 'uniform' then the per-thread predicate bits would be used. However, if compiler 38 determines that the values R0 and R1 are uniform (e.g., if the values used come from constants registers, then the 'uniform' predicate (UPO) could be used instead:

```
CMP.EQ    UPR0 <-C0,C1    //C0 holds 'A', C1 holds 'B', UPR0 is
the single bit shared predicate that holds the compare result.
(UPR0)    <action 1>      //only execute <action 1> if UPR0 == 1
(!UPR0)   <action 2>      //only execute <action 2> if UPR0 == 0
<rest of program>
```

Figure 4:
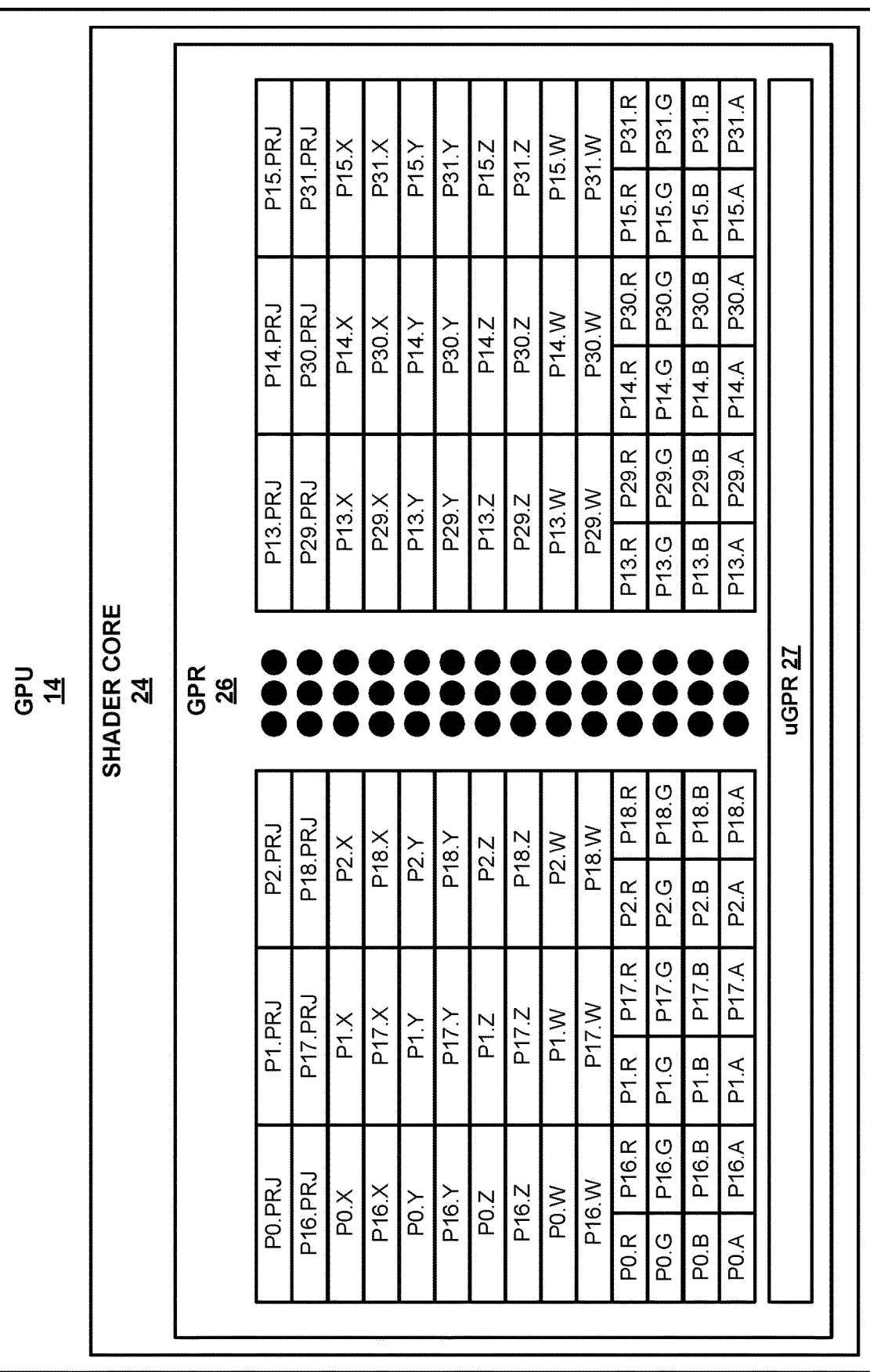
FIG. 4 is a conceptual diagram illustrating an example of data storage in a general purpose register (GPR) of a shader core of a GPU.

FIG. 4 is a conceptual diagram illustrating an example of data storage in a GPR of a shader core of a GPU. As illustrated, GPU 14 includes shader core 24, and shader core 24 includes GPR 26. Although not illustrated in FIG. 4, shader core 24 also includes a plurality of processing elements that each executes an instance of the shader program.

As an example, shader core 24 may include thirty-two processing elements and each may execute one instance of a shader program to process one graphics item. GPR 26 may store data for the graphics items. For instance, GPR 26 may store attribute data for nine attributes for thirty-two graphics items. However, GPR 26 may store data for more or less than nine attributes for the thirty-two graphics items. Also, GPR 26 may store data that is not associated with an attribute of the graphics items, but is the data for a variable needed for processing the graphics items.

In the example illustrated in FIG. 4, the graphics items are identified as P0-P31, which may be vertices. The attribute is identified by the variable following the graphics item identifier. For example, P0.X refers to the x-coordinate for the P0 graphics item, P0.Y refers to the y-coordinate for the P0 graphics item, and so forth. P0.R, P0.G, P0.B, and P0.A refer to the red component, green component, blue component, and opacity of the P0 graphics item, respectively. The other graphics items (e.g., P1-P31) are similarly identified.

In other words, in FIG. 4, vertices P0-P31 are each associated with a plurality of variables. As one example, each of vertices P0-P31 is associated with a variable that identifies the x-coordinate (P0.X to P31.X). Each of vertices P0-P31 is associated with a variable that identifies the y-coordinate (P0.Y to P31Y), and so forth. Each one of these variables is needed for processing each of the plurality of graphics items. For instance, the variable that identifies the x-coordinate is needed for processing each of vertices P0-P31.

As also illustrated in FIG. 4, each of the graphics items also includes a PRJ attribute. The PRJ attribute is a projection matrix that a vertex shader executing on processing elements of shader core 24 may utilize. In this example, the PRJ attribute is another variable that is needed for processing each of vertices P0-P31. For example, the vertex shader may multiply the projection matrix with the respective coordinates (e.g., multiply P0.PRJ with P0.X, P0.Y, P0.Z, and P0.W).

It should be understood that there may be various units in which GPU 14 may store data (e.g., values). GPU 14 may store data in system memory 16 or may store data in local memory (e.g., cache). GPR 26 of shader core 24 is distinct from both system memory 16 and the local memory of GPU 14. For example, system memory 16 is accessible by various components of device 10, and these components use system memory 16 to store data. The local memory of GPU 14 is accessible by various components of GPU 14, and these components use the local memory of GPU 14 to store data. GPR 26, however, may only be accessible by components of shader core 24, and may only store data for the processing elements of shader core 24.

In some examples, one or more variables of graphics items in a graphic wave are uniform across the graphic wave. In such examples, rather than storing the uniform data for the one or more variables in separate entries for each thread in GPR 26, GPU 14 may store the uniform data a single time in uGPR 27. As shown in FIG. 4, the uGPR 27 is part of GPR 26. In other examples, the uGPR 27 may be separate register.

In one example, uGPR 27 may include a plurality of storage locations, where each storage location is associated with one attribute of the plurality of attributes of the graphics items. For instance, as illustrated in FIG. 4, each graphics item P0-P31 includes nine attributes (PRJ, x, y, z, w, R, G, B, and A). In this example, uGPR 27 may include nine storage locations, where the first location of uGPR 27 is associated with PRJ attribute, the second location of the uGPR 27 is associated with the x-coordinate, and so forth. Again, the data in uGPR 27 may be used by each thread of a warp.

Figure 5:
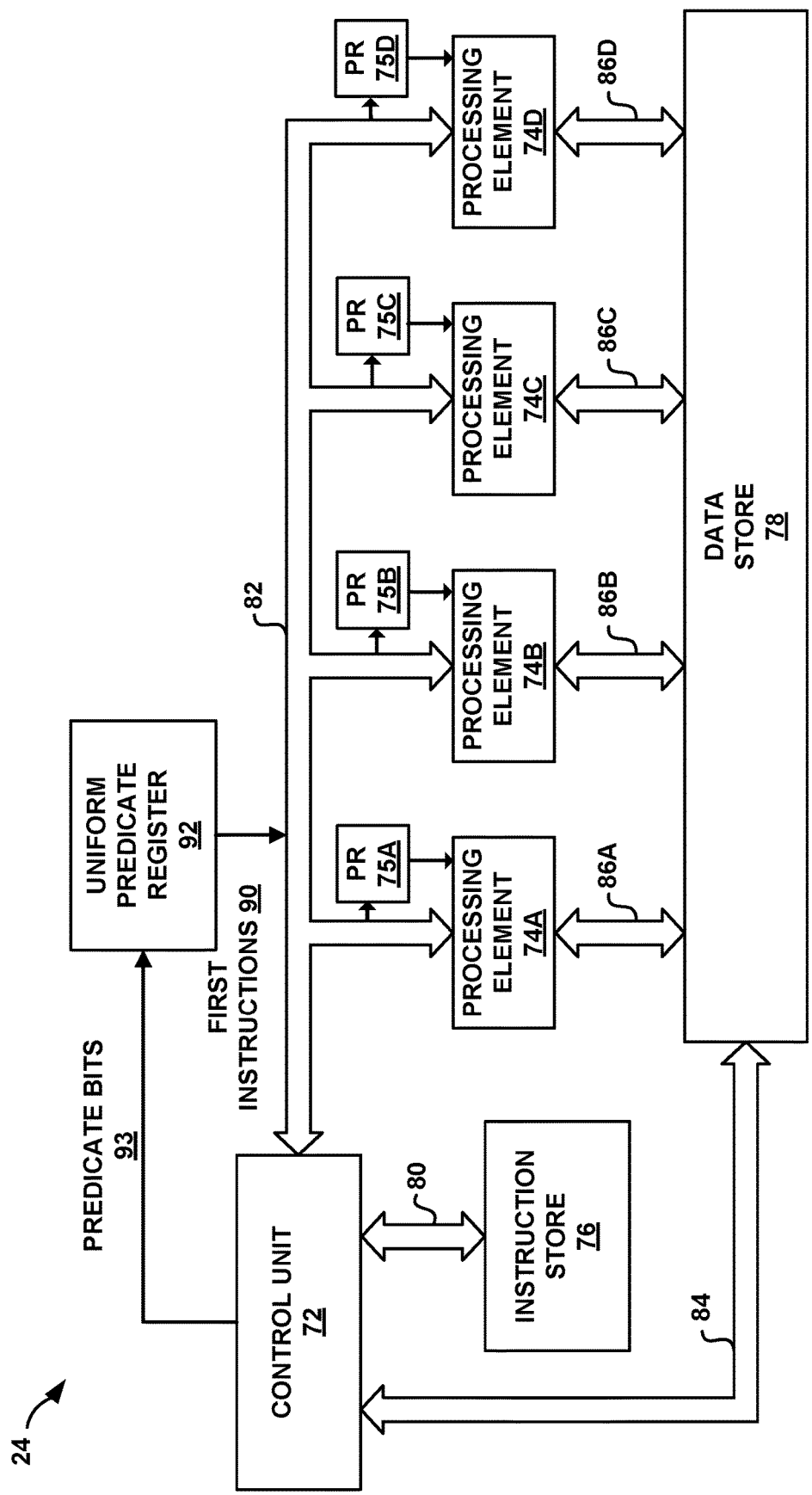
FIG. 5 is a block diagram of an example shader core of the GPU of FIG. 1 in more detail.

FIG. 5 is a block diagram illustrating an example configuration of GPU 14 that may be used to implement the techniques for uniform predicates of this disclosure. GPU 14 is configured to execute instructions for a program in a parallel manner. GPU 14 includes a shader core 24 that includes a control unit 72, processing elements 74A-74D (collectively "processing elements 74"), an instruction store 76, a data store 78, communication paths 80, 82, 84, 86A-86D, predicate registers (PRs) 75A-75D (collectively "predicate registers 75 or PRs 75), and uniform predicate register (UPR) 92. Communication paths 86A-86D may be referred to collectively as "communication paths 86." In some examples, GPU 14 may be configured as a single-instruction, multiple-data (SIMD) processing system that is configured to execute a plurality of threads of execution for a warp of a program (e.g., shader) using processing elements 74. In such a SIMD system, processing elements 74 may together process a single instruction at a time with respect to different data items. The program may retire after all of the threads associated with the program complete execution.

Control unit 72 is communicatively coupled to instruction store 76 via communication path 80, to processing elements 74 via communication path 82, and to data store 78 via communication path 84. Control unit 72 may use communication path 80 to send read instructions to instruction store 76. A read instruction may specify an instruction address in instruction store 76 from which an instruction should be retrieved. Control unit 72 may receive one or more program instructions from instruction store 76 in response to sending the read instruction. Control unit 72 may use communication path 82 to provide instructions to processing elements 74, and in some examples, to receive data from processing elements 74, e.g., the result of a comparison instruction for evaluating a branch condition. In some examples, control unit 72 may use communication path 84 to retrieve data items values from data store 78, e.g., to determine a branch condition. Although FIG. 4 illustrates GPU 14 as including a communication path 84, in other examples, GPU 14 may not include a communication path 84.

Each of processing elements 74 may be configured to process instructions for the program stored in instruction store 76. In some examples, each of processing elements 74 may be configured to perform the same set of operations. For example, each of processing elements 74 may implement the same instruction set architecture (ISA). In additional examples, each of processing elements 74 may be an arithmetic logic unit (ALU). In further examples, GPU 14 may be configured as a vector processor, and each of processing elements 74 may be a processing element within the vector processor. In additional examples, GPU 14 may be a SIMD execution unit, and each of processing elements 74 may be a SIMD processing element within the SIMD execution unit.

The operations performed by processing elements 74 may include arithmetic operations, logic operations, comparison operations, etc. Arithmetic operations may include operations such as, e.g., an addition operation, a subtraction operation, a multiplication operation, etc. The arithmetic operations may also include, e.g., integer arithmetic operations and/or floating-point arithmetic operations. The logic operations may include operations, such as, e.g., a bit-wise AND operation, a bit-wise OR operation, a bit-wise XOR operation, etc. The comparison operations may include operations, such as, e.g., a greater than operation, a less than operation, an equal to zero operation, a not equal to zero operation, etc. The greater than and less than operations may determine whether a first data item is greater than or less than a second data item. The equal to zero and not equal to zero operations may determine whether a data item is equal to zero or not equal to zero. The operands used for the operations may be stored in registers contained in data store 78.

Each of processing elements 74 may be configured to perform an operation in response to receiving an instruction from control unit 72 via communication path 82. In some examples, each of processing elements 74 may be configured to be activated and/or deactivated independently of the other processing elements 74. In such examples, each of processing elements 74 may be configured to perform an operation in response to receiving an instruction from control unit 72 when the respective processing element 74A-74D is activated, and to not perform the operation in response to receiving the instruction from control unit 72 when the respective processing element 74A-74D is deactivated, i.e., not activated.

Each of processing elements 74A-74D may be communicatively coupled to data store 78 via a respective communication path 86A-86D. Processing elements 74 may be configured to retrieve data from data store 78 and store data to data store 78 via communication paths 86. The data retrieved from data store 78 may, in some examples, be operands for the operations performed by processing elements 74. The data stored to data store 78 may, in some examples, be the result of an operation performed by processing elements 74.

Instruction store 76 is configured to store a program for execution by GPU 14. The program may be stored as a sequence of instructions. In some examples, each instruction may be addressed by a unique instruction address value. In such examples, instruction address values for later instructions in the sequence of instructions are greater than instruction address values for earlier instructions in the sequence of instructions. The program instructions, in some examples, may be machine-level instructions. That is, in such examples, the instructions may be in a format that corresponds to the ISA of GPU 14. Instruction store 76 is configured to receive a read instruction from control unit 72 via communication path 80. The read instruction may specify an instruction address from which an instruction should be retrieved. In response to receiving the read instruction, instruction store 76 may provide an instruction corresponding to the instruction address specified in the read instruction to control unit 72 via communication path 80.

Instruction store 76 may be any type of memory, cache or combination thereof. When instruction store 76 is a cache, instruction store 76 may cache a program that is stored in a program memory external to GPU 14. Although instruction store 76 is illustrated as being within GPU 14, in other examples, instruction store 76 may be external to GPU 14.

Data store 78 is configured to store data items used by processing elements 74. In some examples, data store 78 may comprise a plurality of registers, each register being configured to store a respective data item within a plurality of data items operated on GPU 14. Data store 78 may be coupled to one or more communication paths (not shown) that are configured to transfer data between the registers in data store 78 and a memory or cache (not shown).

Although FIG. 4 illustrates a single data store 78 for storing data used by processing elements 74, in other examples, GPU 14 may include separate, dedicated data stores for each of processing elements 74. GPU 14 illustrates four processing elements 74 for exemplary purposes. In other examples, GPU 14 may have many more processing elements in the same or a different configuration.

Control unit 72 is configured to control GPU 14 to execute instructions for a program stored in instruction store 76. For each instruction or set of instructions of the program, control unit 72 may retrieve the instruction from instruction store 76 via communication path 80, and process the instruction. In some examples, control unit 72 may process the instruction by causing an operation associated with the instruction to execute on one or more of processing elements 74. For example, the instruction retrieved by control unit 72 may be an arithmetic instruction that instructs GPU 14 to perform an arithmetic operation with respect to data items specified by the instruction, and control unit 72 may cause one or more of processing elements 74 to perform the arithmetic operation on the specified data items. In further examples, control unit 72 may process the instruction without causing an operation to be performed on processing elements 74.

Control unit 72 may cause an operation to be performed on one or more of processing elements 74 by providing an instruction to processing elements 74 via communication path 82. The instruction may specify the operation to be performed by processing elements 74. The instruction provided to the one or more of processing elements 74 may be the same as or different than the instruction retrieved from instruction store 76. In some examples, control unit 72 may cause the operation to be performed on a particular subset of processing elements 74 (including by a single processing element) by one or both of activating a particular subset of processing elements 74 upon which the operation should be performed and deactivating another subset of processing elements 74 upon which the operation should not be performed. Control unit 72 may activate and/or deactivate processing elements 74 by providing respective activation and/or deactivation signals to each of processing elements 74 via communication path 82. In some examples, control unit 72 may activate and/or deactivate processing elements 74 by providing activation and/or deactivation signals to processing elements 74 in conjunction with providing an instruction to processing elements 74. In further examples, control unit 72 may activate and/or deactivate processing elements 74 prior to providing an instruction to processing elements 74.

Control unit 72 may execute a plurality of threads of execution for a program using processing elements 74. A plurality of threads to be executed in parallel is sometimes called a warp. Each of processing elements 74 may be configured to process instructions of the program for a respective thread of the plurality of threads. For example, control unit 72 may assign each thread of execution to an individual one of processing elements 74 for processing. The threads of execution for the program may execute the same set of instructions with respect to different data items in a set of data items. For example, processing element 74A may execute a first thread of execution for a program stored in instruction store 76 with respect to a first subset of data items in a plurality of data items, and processing element 74B may execute a second thread of execution for the program stored in instruction store 76 with respect to a second subset of data items in the plurality of data items. The first thread of execution may include the same instructions as the second thread of execution, but the first subset of data items may be different than the second subset of data items.

In some examples, control unit 72 may activate and deactivate individual threads in the plurality of threads of execution. When control unit 72 deactivates a thread, control unit 72 may also deactivate and/or disable the processing element 74A-74D that is assigned to execute the thread. Such deactivated threads may be referred to as inactive threads. Similarly, when control unit 72 activates a thread, control unit 72 may also activate the processing element 74A-74D that is assigned to execute the thread. Such activated threads may be referred to as active threads. As will be explained in more detail below, control unit 72 may be configured to select an activate thread to execute a divergent operation (e.g., a serial operation), without needing to consider other active or inactive threads.

As used herein, an active thread may refer to a thread that is activated, and an inactive thread may refer to a thread that is deactivated. For a plurality of threads executing on GPU 14 during a given processing cycle, each of the active threads may be configured to process an instruction of the program identified by a global program counter register for the plurality threads during the processing cycle. For example, control unit 72 may activate processing elements 74 that are assigned to active threads in order to configure such processing elements 74 to process the instruction of the program during the processing cycle. On the other hand, for a plurality of threads executing on GPU 14 during a given processing cycle, each of the inactive threads may be configured to not process the instruction of the program during the processing cycle. For example, control unit 72 may deactivate processing elements 74 that are assigned to inactive threads to configure such processing elements 74 to not process the instruction of the program during the processing cycle.

In some examples, a processing cycle may refer to the time interval between successive loads of the program counter. For example, a processing cycle may refer to the time between when the program counter is loaded with a first value and when the program counter is loaded with a second value. The first and second values may be the same or different values. In examples where the program counter is loaded in an asynchronous manner due to resume check techniques, such asynchronous loads may not, in some examples, serve to differentiate processing cycles. In other words, in such examples, a processing cycle may refer to the time interval between successive synchronous loads of the program counter. A synchronous load of the program counter may, in some examples, refer to a load that is trigged by a clock signal.

Sometime prior to the retrieval of the next instruction, control unit 72 determines a next instruction to be processed by GPU 14. The manner in which control unit 72 determines the next instruction to be processed is different depending on whether the instruction previously retrieved by GPU 14 is a control flow instruction. If the instruction previously retrieved by GPU 14 is not a control flow instruction, then control unit 72 may determine that the next instruction to be processed by GPU 14 corresponds to a next sequential instruction stored in instruction store 76. For example, instruction store 76 may store the instructions for a program in an ordered sequence, and the next sequential instruction may be an instruction that occurs immediately after the previously retrieved instruction.

If the instruction previously retrieved by GPU 14 is a control flow instruction, then control unit 72 may determine the next instruction to be processed by GPU 14 based on information specified in the control flow instruction. For example, the control flow instruction may be an unconditional control flow instruction, e.g., an unconditional branch instruction or a jump instruction, in which case control unit 72 may determine the next instruction to be processed by GPU 14 is a target instruction identified by the control flow instruction. As another example, the control flow instruction may be a conditional control flow instruction, e.g., a conditional branch instruction, in which case control unit 72 may select one of a target instruction identified by the control flow instruction or a next sequential instruction stored in instruction store 76 as the next instruction to process from instruction store 76.

As used herein, a control flow instruction may refer to an instruction that includes information that identifies a target instruction in instruction store 76. For example, the control flow instruction may include a target value indicative of a target program counter value for the control flow instruction. The target program counter value may be indicative of a target address for the target instruction. The target instruction may, in some examples, be different than the next sequential instruction stored in instruction store 76. High-level program code may include control flow statements such as, e.g., if, switch, do, for, while, continue, break, and goto statements. Compiler 38 may translate the high-level control flow statements into low-level, e.g., machine-level, control flow instructions. An instruction that is not a control flow instruction may be referred to herein as a sequential instruction. For example, a sequential instruction may not include information that identifies a target instruction.

For control flow instructions, the information that identifies the target instruction may be a value indicative of a target instruction stored in instruction store 76. In some examples, the value indicative of the target instruction in instruction store 76 may be a value indicative of the instruction address of the target instruction in instruction store 76. The value indicative of the instruction address of the target instruction may, in some cases, be the address of the target instruction in instruction store 76. The value indicative of the instruction address of the target instruction may, in additional cases, be a value used to calculate the address of the target instruction. In further examples, the value indicative of the instruction address of the target instruction may be a value indicative of a target program counter value that corresponds to the target instruction. The value indicative of the target program counter value may, in some cases, be the target program counter value that corresponds to the target instruction. The value indicative of the target program counter value may, in additional cases, be a value used to calculate the target program counter value. The target program counter value that corresponds to the target instruction may, in some examples, be equal to the address of the target instruction.

A control flow instruction may be a forward control flow instruction or a backward control flow instruction. A forward control flow instruction may be a control flow instruction where the target instruction occurs after the control flow instruction in the ordered sequence of instructions stored in instruction store 76. A backward control flow instruction may be a control flow instruction where the target instruction occurs prior to the next sequential instruction in the ordered sequence of instructions stored in instruction store 76. The next sequential instruction may occur immediately after the control flow instruction in the ordered sequence of instructions.

A control flow instruction may be a conditional control flow instruction or an unconditional control flow instruction. A conditional control flow instruction includes information that specifies a condition for jumping to the target instruction associated with the control flow instruction. When processing a conditional control flow instruction, if control unit 72 determines that the condition is satisfied, then control unit 72 may determine that the next instruction to be processed is the target instruction. On the other hand, if control unit 72 determines that the condition is not satisfied, then control unit 72 may determine that the next instruction to be processed is the next sequential instruction stored in instruction store 76. An unconditional control flow instruction does not include information that specifies a condition for jumping to the target instruction associated with the control flow instruction. When processing an unconditional control flow instruction, control unit 72 may unconditionally determine that the next instruction to process is the target instruction identified by the control flow instruction. In other words, the determination in such a case is not conditioned upon any condition specified in the unconditional control flow instruction. As used herein, a condition control flow instruction may be referred to herein as a branch instruction unless the branch instruction is otherwise designated as an unconditional branch instruction. Also, an unconditional control flow instruction may be referred to herein as a jump instruction.

A conditional branch instruction may include conditions that are specified with respect to one or more data item values. For example, one type of condition may be a comparison condition that compares a first data item value to a second data item value for each active thread executing in GPU 14. Comparing the data item values may include, e.g., determining whether the first data item value is greater than, less than, not greater than, not less than, equal to, or not equal to the second data item value. Another type of condition may be a zero check condition that determines whether a data item value for each active thread executing on GPU 14 is equal to or not equal to zero. Because each of processing elements 74 operates on different data items, the result of evaluating the condition may be different for each active thread executing on GPU 14.

If all of the active threads executing on GPU 14 satisfy the branch condition or all of the active threads executing on GPU 14 do not satisfy the branch condition, then a uniform branching condition occurs and the branching divergence for the threads is said to be uniform. On the other hand, if at least one of the active threads executing on GPU 14 satisfies the branch condition and at least one of the active threads executing on GPU 14 does not satisfy the branch condition, then a divergent branching condition occurs and the branching divergence for the threads is said to be divergent.

One example of a divergent instruction is an if-then-else instruction. As discussed above, when processing an if-then-else instruction, the 'if (condition)' term determines if a particular condition is true (e.g., by comparing one value to another value). Regardless of how the condition is determined, if the condition is true, a processing element 74 in shader core 24 executes a first portion of the set of instructions (e.g., portion 41). If the condition is not true, a processing element 74 executes a second portion of the set of instructions (e.g., portion 43). In some examples, the portion of the instructions executed in accordance with the branching condition may be a no operation instruction (e.g., the branching instructions may include instruction to not perform any operations).

To indicate how each of processing elements 74 is to handle a branching instruction, control unit 72 may store predicate bits in each of the respective predicate registers 75. Each processing element 74 may access a dedicated PR 75 associated with the particular processing element. This is because each of processing elements 74 typically operates on different data. As such, the condition for the branching instructions may be different for each of processing elements 74 (i.e., different for each thread of a branch).

As discussed above, the predicate bits indicate which portions of a set of instructions will be executed by the particular thread, and as such, a particular processing element 74. In some examples, the predicate bits may specify which portions of a set of instructions to execute. In other examples, the predicate bits indicate which portions of the set of instructions not to execute. Regardless, each processing element 74 of a warp executes the set of instructions in parallel. If a particular processing element 74 does not execute a particular portion of the set of instructions as indicated by the predicate bits, that particular processing element 74 performs no action (e.g., executes a no operation instructions) while other processing elements 74 in the warp execute that particular portion of the set of instructions.

In accordance with the techniques of this disclosure, processor 12 (e.g., through execution of compiler 38) may be further configured to determine if all threads of a warp will take the same branch of a branching instruction. If such a determination is made, compiler 38 may indicate to GPU 14 to set a single set of uniform predicate bits that may be used for every thread in the warp. That is, rather than having separate predicates bits for each thread of a warp, when all threads take the same branch of a conditional branching instruction, only a single set of predicate bits are stored.

For example, control unit 72 may be configured to store a single set of uniform predicate bits 93 in UPR 92 in response to a determination that all threads of a warp for first instructions 90 are to execute the same branch of branching instructions. First instructions 90 may be any set of instructions of a shader program that includes a branching instruction. Predicate bits 93 stored in UPR 92 are accessible by each of processing elements 74 executing the warp. By including a single set of predicate bits 93 for all of processing elements 74 power may be saved because only a single test is performed for the predicate set (as opposed to a test of the predicate for each thread).

Figure 6:
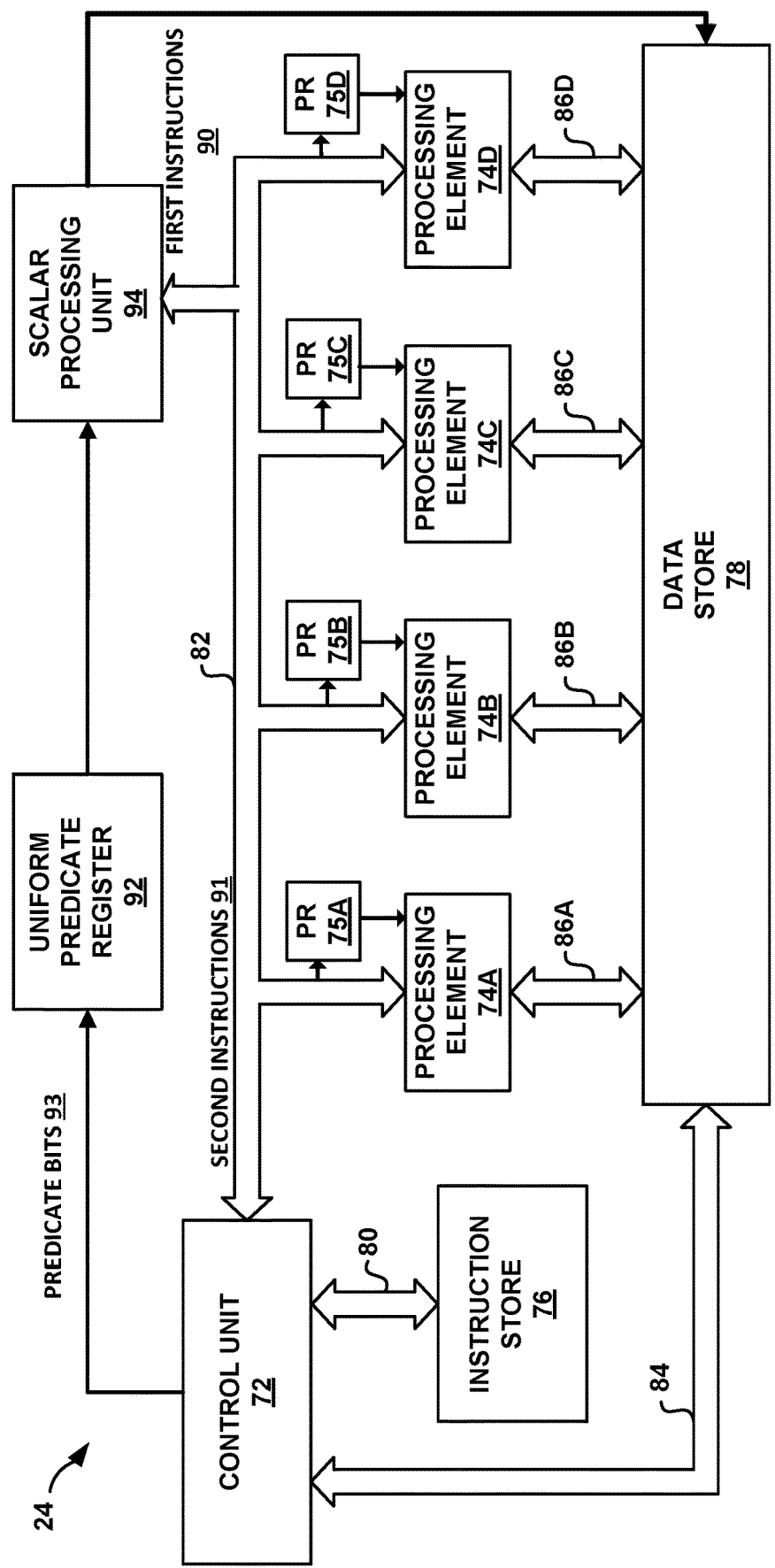
FIG. 6 is a block diagram of another example shader core of the GPU of FIG. 1 in more detail.

FIG. 6 is a block diagram of another example shader core of the GPU of FIG. 1 in more detail. In the example of FIG. 6, shader core 24 is the same as shown in FIG. 5, except with the addition of scalar processing unit 94. In this example, scalar processing unit 94 may be used to execute the first instructions 90 in the case that the predicate bits in UPR 92 indicate that all threads of a warp branch in the same direction and the data to be processed is uniform. In this way, rather than using the vector processor that includes processing elements 74, a single scalar processing unit 94 may be used to process the uniformly branching first instructions 90 that are executed on uniform data. In some examples, processing elements 74 may then be used to process second instructions 91 (which may not be uniformly branching) in parallel with scalar processing unit 94.

Using scalar processing unit 94 to execute uniformly branching instructions, as indicated by the predicate bits 93 in UPR 92, provides some implementation benefits. This is because scalar processing unit 94 need not access PRs 75 to determine how a set of instructions branch. As such, there are no 'collisions' or ambiguous states between the second instructions 91 executed by processing elements 74 and first instructions 90 executed by scalar processing unit 94. This allows processing of first instructions 90 and second instructions 91 in parallel.

Scalar processing unit 94 may be any type of processor that is configured to operate on one data item at a time. Like processing elements 74, scalar processing unit 94 may include an ALU. The operations performed by scalar processing unit 94 may include arithmetic operations, logic operations, comparison operations, etc. Arithmetic operations may include operations such as, e.g., an addition operation, a subtraction operation, a multiplication operation, a division operation, etc. The arithmetic operations may also include, e.g., integer arithmetic operations and/or floating-point arithmetic operations. The logic operations may include operations, such as, e.g., a bit-wise AND operation, a bit-wise OR operation, a bit-wise XOR operation, etc. The comparison operations may include operations, such as, e.g., a greater than operation, a less than operation, an equal to zero operation, a not equal to zero operation, etc. The greater than and less than operations may determine whether a first data item is greater than or less than a second data item. The equal to zero and not equal to zero operations may determine whether a data item is equal to zero or not equal to zero. The operands used for the operations may be stored in registers contained in data store 78.

In some situations, each thread of first instructions 90 branches the same way, because each data element or graphics item to be operated on by the warp is the same value. In this example, scalar processing unit 94 need only perform one operation and the result of that operation may be stored for all data elements that were to be processed.

Figure 7:
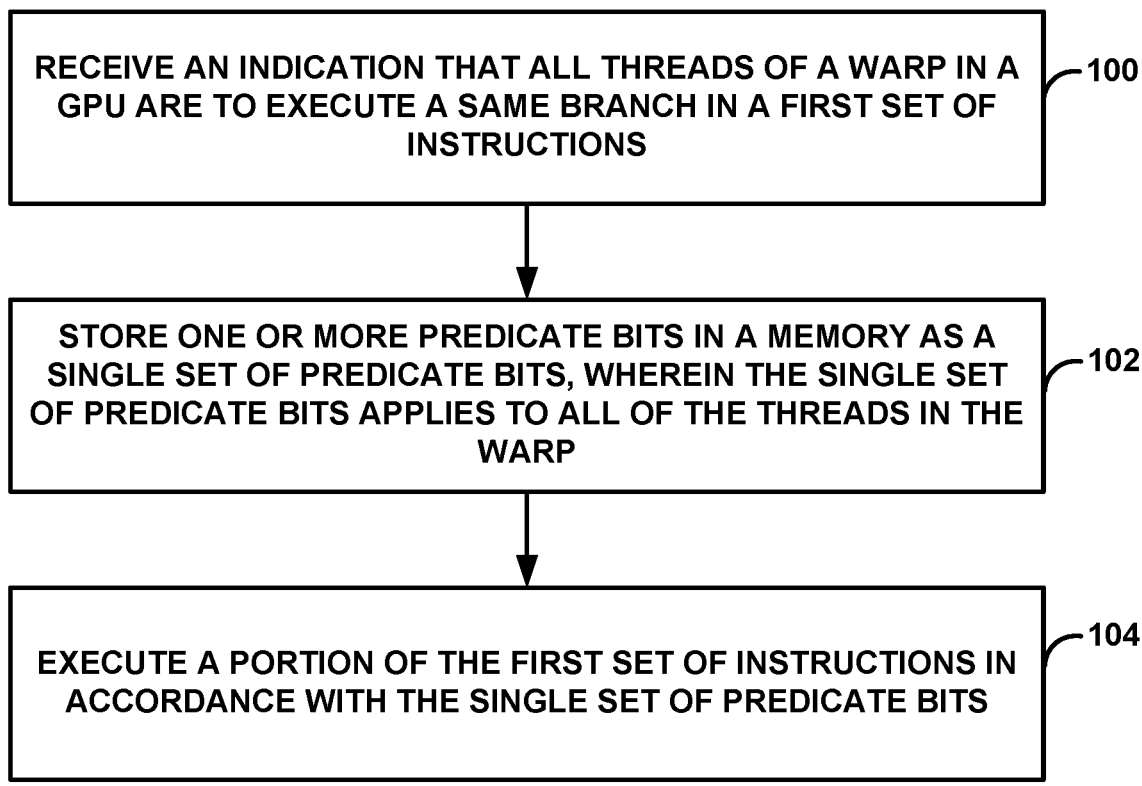
FIG. 7 is a flowchart illustrating an example technique of processing data in a GPU.

FIG. 7 is a flowchart illustrating an example method according to the techniques of this disclosure. The techniques of FIG. 7 may be implemented by one or more of GPU 14 and/or processor 12 (see FIG. 1).

In one example of the disclosure, GPU 14 may be configured to receive an indication that all threads of a warp in GPU 14 are to execute a same branch in a first set of instructions (100). GPU 14 may be further configured to store one or more predicate bits in a memory as a single set of predicate bits, wherein the single set of predicate bits applies to all of the threads in the warp (102). GPU 14 may be further configured to execute a portion of the first set of instructions in accordance with the single set of predicate bits (104).

In one example of the disclosure, the single set of predicate bits indicate the portion of the first set of instructions to be performed by each thread of the warp, the portion of the set of instructions relating to the same branch in the first set of instructions. In another example of the disclosure, the single set of predicate bits indicate the portion of the first set of instructions not to be performed by each thread of the warp, the portion of the set of instructions relating to the same branch in the first set of instructions.

In another example of the disclosure, GPU 14 may be configured to execute the first set of instruction in accordance with the single set of predicate bits using a SIMD processing core (e.g., processing elements 74 of FIG. 5). In another example of the disclosure, GPU 14 may be configured to execute the first set of instruction in accordance with the single set of predicate bits using a scalar processing unit (e.g., scalar processing unit 94 of FIG. 6). In one example, GPU 14 may be configured to execute a second set of instructions using a SIMD processing core in parallel with executing the first set of instruction in accordance with the single set of predicate bits using the scalar processing unit.

In another example of the disclosure, processor 12 may be configured to determine that all threads of the warp in the GPU are to execute the same branch of the first set of instructions, and the indication in response to the determination. In another example, processor 12 may be configured to determine that all threads of the warp in GPU 14 are to execute the same branch of the first set of instructions by determining that the entire warp for the first set of instructions uses the same set of constants or by determining that the entire warp for the first set of instructions uses data from a uniform general purpose register (uGPR) that applies to all threads of the warp.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for processing data, the method comprising:
determining that a plurality of threads of a warp in a graphics processing unit (GPU) are to execute a same branch of a first set of instructions by determining that the plurality of threads of the warp for the first set of instructions uses a same set of constants or by determining that the plurality of threads of the warp for the first set of instructions uses data from a uniform general purpose register (uGPR) that applies to the plurality of threads of the warp;
sending an indication, in response to the determination, that the plurality of threads of the warp in the GPU are to execute the same branch in the first set of instructions;
receiving the indication that the plurality of threads of the warp in the GPU are to execute the same branch in the first set of instructions;
storing one predicate bit in a memory, wherein the predicate bit applies to all of the plurality of threads in the warp; and
executing a portion of the first set of instructions in accordance with the predicate bit.

2. The method of claim 1, wherein the predicate bit indicates the portion of the first set of instructions to be performed by each of the plurality of threads of the warp, the portion of the set of instructions relating to the same branch in the first set of instructions.

3. The method of claim 1, wherein the predicate bit indicates the portion of the first set of instructions not to be performed by each of the plurality of threads of the warp, the portion of the set of instructions relating to the same branch in the first set of instructions.

4. The method of claim 1, wherein executing the portion of the first set of instructions comprises:
executing the portion of the first set of instructions in accordance with the predicate bit using a single instruction, multiple data (SIMD) processing core.

5. The method of claim 1, wherein executing the portion of the first set of instructions comprises:
executing the portion of the first set of instructions in accordance with the predicate bit using a scalar processing unit.

6. The method of claim 5, further comprising:
executing a second set of instructions using a single instruction, multiple data (SIMD) processing core in parallel with executing the first set of instructions in accordance with the predicate bit using the scalar processing unit.

7. An apparatus for processing data, the apparatus comprising:
a memory configured to store a first set of instructions; and
a first processor configured to:
determine that a plurality of threads of a warp in a second processor are to execute a same branch of a first set of instructions by determining that the plurality of threads of the warp for the first set of instructions uses a same set of constants or by determining that the plurality of threads of the warp for the first set of instructions uses data from a uniform general purpose register (uGPR) that applies to all threads of the warp; and
send an indication, in response to the determination, to the second processor; and
the second processor in communication with the first processor, the second processor configured to:
receive the indication that the plurality of threads of the warp in the second processor are to execute the same branch in the first set of instructions;
store one predicate bit in a register, wherein the predicate bit applies to all of the plurality of threads in the warp; and
execute a portion of the first set of instructions in accordance with the predicate bit.

8. The apparatus of claim 7, wherein the second processor is a graphics processing unit (GPU).

9. The apparatus of claim 7, wherein the second processor further includes a single instruction, multiple data (SIMD) processing core including multiple processing elements, the apparatus further comprising:
the register, wherein the register is accessible by each of the multiple processing elements of the SIMD core.

10. The apparatus of claim 7, wherein the predicate bit indicates the portion of the first set of instructions to be performed by each of the plurality of threads of the warp, the portion of the set of instructions relating to the same branch in the first set of instructions.

11. The apparatus of claim 7, wherein the predicate bit indicates the portion of the first set of instructions not to be performed by each of the plurality of threads of the warp, the portion of the set of instructions relating to the same branch in the first set of instructions.

12. The apparatus of claim 7, wherein the second processor is further configured to execute the portion of the first set of instructions in accordance with the predicate bit using the SIMD processing core.

13. The apparatus of claim 7, wherein the second processor further includes a scalar processing unit, and wherein the second processor is further configured to execute the portion of the first set of instructions in accordance with the predicate bit using the scalar processing unit.

14. The apparatus of claim 13, wherein the second processor further includes a single instruction, multiple data (SIMD) processing core including multiple processing elements, and wherein the second processor is further configured to execute a second set of instructions using the SIMD processing core in parallel with executing the first set of instructions in accordance with the predicate bit using the scalar processing unit.

15. The apparatus of claim 7, wherein the first processor is a central processing unit (CPU).

16. The apparatus of claim 7, wherein the apparatus is a wireless communications device.

17. An apparatus for processing data, the apparatus comprising:
   means for determining that a plurality of threads of a warp in a graphics processing unit (GPU) are to execute a same branch of a first set of instructions by determining that the plurality of threads of the warp for the first set of instructions uses a same set of constants or by determining that the plurality of threads of the warp for the first set of instructions uses data from a uniform general purpose register (uGPR) that applies to the plurality of threads of the warp;
   means for sending an indication, in response to the determination, that the plurality of threads of the warp in the GPU are to execute the same branch in the first set of instructions;
   means for receiving the indication that the plurality of threads of the warp in the GPU are to execute the same branch in the first set of instructions;
   means for storing one predicate bit in a memory, wherein the predicate bit applies to all of the plurality of threads in the warp; and
   means for executing a portion of the first set of instructions in accordance with the predicate bit.

18. The apparatus of claim 17, wherein the predicate bit indicates the portion of the first set of instructions not to be performed by each of the plurality of threads of the warp, the portion of the set of instructions relating to the same branch in the first set of instructions.

19. The apparatus of claim 17, wherein the means for executing the portion of the first set of instructions comprises:
   means for executing the portion of the first set of instructions in accordance with the predicate bit using a single instruction, multiple data (SIMD) processing core.

20. The apparatus of claim 17, wherein the means for executing the portion of the first set of instructions comprises:
   means for executing the portion of the first set of instructions in accordance with the predicate bit using a scalar processing unit.

21. The apparatus of claim 20, further comprising:
   means for executing a second set of instructions using a single instruction, multiple data (SIMD) processing core in parallel with executing the first set of instructions in accordance with the predicate bit using the scalar processing unit.

22. A non-transitory computer-readable storage medium storing instructions that, when executed, causes one or more processor to:
   determine that a plurality of threads of a warp in a graphics processing unit (GPU) are to execute a same branch of a first set of instructions by determining that the plurality of threads of the warp for the first set of instructions uses a same set of constants or by determining that the plurality of threads of the warp for the first set of instructions uses data from a uniform general purpose register (uGPR) that applies to the plurality of threads of the warp;
   send an indication, in response to the determination, that the plurality of threads of the warp in the GPU are to execute the same branch in the first set of instructions;
   receive the indication that the plurality of threads of the warp in the GPU are to execute the same branch in the first set of instructions;
   store one predicate bit in a memory, wherein the predicate bit applies to all of the plurality of threads in the warp; and
   execute a portion of the first set of instructions in accordance with the predicate bit.

23. The non-transitory computer-readable storage medium of claim 22, wherein the predicate bit indicates the portion of the first set of instructions not to be performed by each of the plurality of threads of the warp, the portion of the set of instructions relating to the same branch in the first set of instructions.

24. The non-transitory computer-readable storage medium of claim 22, wherein the instructions further cause the one or more processors to:
   execute the portion of the first set of instructions in accordance with the predicate bit using a single instruction, multiple data (SIMD) processing core.

25. The non-transitory computer-readable storage medium of claim 22, wherein the instructions further cause the one or more processors to:
   execute the portion of the first set of instructions in accordance with the predicate bit using a scalar processing unit.

26. The non-transitory computer-readable storage medium of claim 25, wherein the instructions further cause the one or more processors to:
   execute a second set of instructions using a single instruction, multiple data (SIMD) processing core in parallel with executing the first set of instructions in accordance with the predicate bit using the scalar processing unit.

* * * * *